US008687808B2

(12) United States Patent
Akhavan-Toyserkani et al.

(10) Patent No.: US 8,687,808 B2
(45) Date of Patent: Apr. 1, 2014

(54) METHOD AND SYSTEM FOR SELF SYNCHRONIZING CRYPTOGRAPHIC PARAMETERS (75) Inventors: Kasra Akhavan-Toyserkani, North Bethesda, MD (US); Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 48 days.

(21) Appl. No.: 13/525,169

(22) Filed: Jun. 15, 2012

(65) Prior Publication Data

US 2012/0263299 A1    Oct. 18, 2012

Related U.S. Application Data (60) Provisional application No. 61/622,318, filed on Apr. 10, 2012.

(51) Int. Cl.
*H04L 9/12* (2006.01)
*H04K 1/00* (2006.01)

(52) U.S. Cl.
USPC ............................ 380/255; 380/260; 380/277

(58) Field of Classification Search
USPC ......................................... 380/255, 260, 277
See application file for complete search history.

(56) References Cited

U.S. PATENT DOCUMENTS

| 5,222,137 | A  | * | 6/1993  | Barrett et al. ................. 380/271 |
| 6,697,490 | B1 |   | 2/2004  | Mizikovsky |
| 7,010,802 | B1 |   | 3/2006  | Bernath |
| 7,433,472 | B2 |   | 10/2008 | McLean |
| 7,724,638 | B2 |   | 5/2010  | Murakami |
| 7,751,565 | B2 |   | 7/2010  | Yuen |
| 7,978,851 | B2 |   | 7/2011  | Kiyomoto |
| 8,041,031 | B2 |   | 10/2011 | Gligoroski |
| 2002/0095604 | A1 | * | 7/2002 | Hausler ........................ 713/201 |
| 2005/0091499 | A1 | * | 4/2005 | Forlenza et al. ............. 713/176 |
| 2007/0291855 | A1 |   | 12/2007 | Reznic |
| 2010/0098254 | A1 |   | 4/2010 | Chowdhary |
| 2010/0289627 | A1 |   | 11/2010 | McAllister |

OTHER PUBLICATIONS

Header Label. In Microsoft Computer Dictionary. Microsoft Press 2002.*

* cited by examiner

*Primary Examiner* — William Powers
(74) *Attorney, Agent, or Firm* — Booth Udall Fuller, PLC (57) ABSTRACT A method for encryption and decryption synchronization for a communications channel comprising encrypting a communications channel using a data encryption device, the communications channel comprising a data stream having unique information native to the data stream, transmitting the encrypted data stream using a transmitter without applying an additional framing structure or a multiplexing signaling message after the data stream is encrypted such that the encrypted data stream does not require additional bandwidth to support cryptographic synchronization, receiving by a receiver comprising a decryption device, the transmitted encrypted data stream, and identifying the unique information within the transmitted data stream by iteratively decrypting the encrypted data stream using a processor until a cryptographic parameter is found that results in cryptographic synchronization between the encryption and decryption devices based on a priori knowledge of the unique information within the transmitted data stream.

50 Claims, 6 Drawing Sheets

METHOD AND SYSTEM FOR SELF SYNCHRONIZING CRYPTOGRAPHIC PARAMETERS

CROSS REFERENCE TO RELATED APPLICATIONS

This document claims the benefit of the filing date of U.S. Provisional Patent Application No. 61/622,318, entitled "Method and System for Self Synchronizing Cryptographic Parameters" to Kasra Akhavan-Toyserkani, which was filed on Apr. 10, 2012, the disclosure of which is hereby incorporated entirely by reference herein.

BACKGROUND

1. Technical Field

Aspects of this document relate generally to telecommunication systems and techniques for transmitting data across a telecommunication channel.

2. Background Art

The ability to provide encryption of user data is not novel to the communications industry in and of itself. Many methods have been developed to obscure, encrypt, obfuscate, etc. data in a manner designed to prevent someone who is unauthorized from receiving content in a usable format or expose user information in a decipherable format.

In the existing art, many cryptographic solutions require additional bandwidth through in-band key message signaling and/or framing structures to simply synchronize certain cryptographic parameters, such as key index and block cipher boundary.

SUMMARY

Implementations of a method for encryption and decryption synchronization for a communications channel may comprise encrypting a communications channel using a data encryption device, the communications channel comprising a data stream having unique information native to the data stream, transmitting the encrypted data stream using a transmitter without applying an additional framing structure or a multiplexing signaling message before or after the data stream is encrypted such that the encrypted data stream does not require additional bandwidth to support cryptographic synchronization, receiving by a receiver comprising a decryption device, the transmitted encrypted data stream, and identifying the unique information within the transmitted data stream by iteratively decrypting the encrypted data stream using a processor until a cryptographic parameter is found that results in cryptographic synchronization between the encryption and decryption devices based on a priori knowledge of the unique information within the transmitted data stream.

Particular implementations may comprise one or more of the following features. The unique information may comprise a repeating pattern. The repeating pattern may comprise at least one of a header, a control sequence, a pilot sequence, and a trailing sequence. The unique information may comprise one or more bits, words, symbol, pilot sequences, or training sequences. The data stream may comprise an error detection scheme. The error detection scheme may comprise a parity or cyclic redundancy check (CRC) scheme. The cryptographic parameter may comprise a plurality of parameters constituting a multi-dimensional array. The cryptographic parameter may comprise an encryption block boundary that is independent of a location of the unique information within the data stream. The cryptographic parameter may comprise an encryption key index. The cryptographic parameter may be dynamically changing.

Implementations of a method of determining cryptographic synchronization of encrypted data transmitted across a communication channel may comprise receiving by a receiver, an encrypted communications channel comprising a data stream having a unique information native to the data stream prior to encryption, attempting to decrypt the encrypted data stream using a decryption device and one or more a priori cryptographic keys, iteratively processing, using a processor, a decrypted signal output from the decryption device, and determining, by the processor, that cryptographic synchronization exists between the decryption device and an encryption device by identifying the unique information native to the data stream based on the iterative processing.

Particular implementations may comprise one or more of the following features. The method may further comprise transmitting, by the processor, a signal to the decryption device that indicates the existence of cryptographic synchronization. The method may further comprise transmitting, by the processor, a signal to the decryption device indicating nonexistence of cryptographic synchronization and prompting the decryption device to advance to a different cryptographic key index. The method may further comprise transmitting, by the processor, a signal to the decryption device indicating nonexistence of cryptographic synchronization and prompting the decryption device to advance the cryptographic boundary in steps of one or more bits, bytes, words, frames, packets, symbols, or pilot sequences. The method may further comprise performing, by the processor, a multi-dimensional recursive search by iteratively processing the decrypted signal output based on a plurality of cryptographic parameters.

The decryption device may use all possible a priori key indices. The method may further comprise using an a priori codebook by the decryption device to step through all possible a priori cryptographic key indices. The processor may determine whether cryptographic synchronization exists based on an acquisition threshold that comprises a configurable value. The acquisition threshold may comprise a single event. The acquisition threshold may comprise a series of events. The decryption device may resume operation in a last known state of cryptographic synchronization after a loss of cryptographic synchronization is detected. The processor may cease iteratively processing when cryptographic synchronization is determined to exist. The processor may continue iteratively processing after cryptographic synchronization is determined to exist based on a change in one or more dynamic cryptographic parameters. The method may further comprise updating a cryptographic key index based on a key-rollover event. The method may further comprise storing, by a memory device, the received encrypted data stream thereby ensuring lossless transition during a change in one or more dynamic cryptographic parameters.

Implementations of a system for encryption and decryption synchronization for a communications channel may comprise an encryption device configured to encrypt a communications channel, the communications channel comprising a data stream having unique information native to the data stream, a transmitter configured to transmit the encrypted data stream without applying an additional framing structure or a multiplexing signaling message after the data stream is encrypted such that the encrypted data stream does not require additional bandwidth to support cryptographic synchronization, a receiver comprising a decryption device and configured to receive the transmitted encrypted data stream, and a processing device configured to identify the unique information within the transmitted data stream by iteratively decrypting the encrypted data stream until a cryptographic parameter is found that results in cryptographic synchronization between the encryption and decryption devices based on a priori knowledge of the unique information within the transmitted data stream.

Particular implementations may comprise one or more of the following features. The unique information may comprise a repeating pattern. The repeating pattern may comprise at least one of a header, a control sequence, a pilot sequence, and a trailing sequence. The unique information may comprise one or more bits, words, symbol, pilot sequences, or training sequences. The data stream may comprise an error detection scheme. The error detection scheme may comprise a parity bit, checksum or a cyclic redundancy check. The cryptographic parameter may comprise a plurality of parameters constituting a multidimensional array. The cryptographic parameter may comprise an encryption block boundary that is independent of a location of the unique information within the data stream. The cryptographic parameter may be an encryption key index. The cryptographic parameter may be dynamically changing.

Implementations of a system for determining cryptographic synchronization of encrypted data transmitted across a communication channel may comprise a receiver configured to receive an encrypted communications channel comprising a data stream having a unique information native to the data stream prior to encryption, a decryption device configured to attempt to decrypt the encrypted data stream using one or more a priori cryptographic keys, and a processing device configured to iteratively process, a decrypted signal output from the decryption device, and determining, by the processor, that cryptographic synchronization exists between the decryption device and an encryption device by identifying the unique information native to the data stream based on the iterative processing.

Particular implementations may comprise one or more of the following features. The processing device may be further configured to transmit a signal to the decryption device that indicates the existence of cryptographic synchronization. The processing device may be further configured to transmit a signal to the decryption device indicating nonexistence of cryptographic synchronization and prompting the decryption device to advance to a different cryptographic key index. The processing device may be further configured to transmit a signal to the decryption device indicating nonexistence of cryptographic synchronization and prompting the decryption device to advance the cryptographic boundary in steps of one or more bits, bytes, words, frames, packets, symbols, or pilot sequences. The processor may be further configured to perform a multi-dimensional recursive search by iteratively processing the decrypted signal output based on a plurality of cryptographic parameters. The decryption device may be configured to use all possible a priori key indices. The decryption device may be configured to use an a priori codebook by the decryption device to step through all possible a priori cryptographic key indices. The processing device may be further configured to determine whether cryptographic synchronization exists based on an acquisition threshold that comprises a configurable value.

The acquisition threshold may comprise a single event. The acquisition threshold may comprise a series of events. The decryption device may be configured to resume operation in a last known state of cryptographic synchronization after a loss of cryptographic synchronization is detected. The processing device may be configured to cease iteratively processing when cryptographic synchronization is determined to exist. The processing device may be configured to continue iteratively processing after cryptographic synchronization is determined to exist based on a change in one or more dynamic cryptographic parameters. The decryption device may be further configured to update a cryptographic key index based on a key-rollover event. The system may further comprise a memory device configured to store the received encrypted data stream thereby ensuring lossless transition during a change in one or more dynamic cryptographic parameters.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description , Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

DESCRIPTION

This disclosure, its aspects and implementations, are not limited to the specific components, encryption types, or methods disclosed herein. Many additional components and assembly procedures known in the art consistent with a method for self-synchronizing cipher are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to a method for providing cipher synchronization for a communications channel. In the existing art, encryption and decryption endpoints are synchronized through specific framing structure and/or cryptographic specific signaling. In implementations of the described method, encryption and decryption endpoints are synchronized by leveraging unique information embodied within the transmitted data itself rather than within an appended header or other information added before or after the data is encrypted. This unique information may be a deterministic pattern, checksum or cyclic redundancy check (CRC) scheme, or any other a priori known information within the transmitted data. The decryption engine then leverages the known information to search and synchronize cryptographic parameters, such as key index and block cipher alignment, in an iterative process.

Particular implementations of a method for providing self-synchronizing cipher for communications links as disclosed herein may be specifically employed in wireless satellite communications systems. However, as it will be clear to those of ordinary skill in the art from this disclosure, the principles and aspects disclosed herein may readily be applied to any electromagnetic (IF, RF, optical and the like) communications system, such as cellular phone, wireless networking devices, or airborne, satellite, or terrestrial broadcast network without undue experimentation.

This disclosure relates to a method and system for providing self-synchronizing decryption without the need for cryptographic signaling nor specific framing structure. The described methods and systems offer a novel approach for providing a secure transmission path for a communication system that is more bandwidth efficient and likely more secure. Particular implementations described herein may used but are not limited to using techniques for cryptography that may be implemented in devices such as a Field-Programmable Gate Array (FPGA), Programmable Logic Device (PLD), Programmable Integrated Circuit (PIC), Digital Signal Processor (DSP), Application Specific Integrated Circuit (ASIC) or general purpose microprocessors.

The need to provide a secure transmission channel continues to be an ongoing challenge in the communications industry. Many cryptographic methods exist in the existing art, and may be brought to bear to provide both physical and data security. Implementations of the described method provides a novel approach for synchronizing encryption and decryption endpoints for any broadcast medium whether the transmission scheme is point-to-point, point-to-multipoint or multi-point-to-multipoint.

The self synchronizing cipher provides a method for synchronizing certain cryptographic parameters such as a key index and a block cipher boundary between cryptographic endpoints without imposing additional bandwidth overhead for framing structure and/or the need for management messaging. Each endpoint is capable of self-synchronizing on certain cryptographic parameters. This approach provides bandwidth savings and may also provide for a more secure transmission link.

Implementations of the described method and system operate independent of a feedback channel and may operate in both one-way and two-way transmission environments.

The described implementations may provide the ability for someone skilled in the art, e.g., a communications software or hardware engineer, and the like to utilize the described methods.

Figure 1:
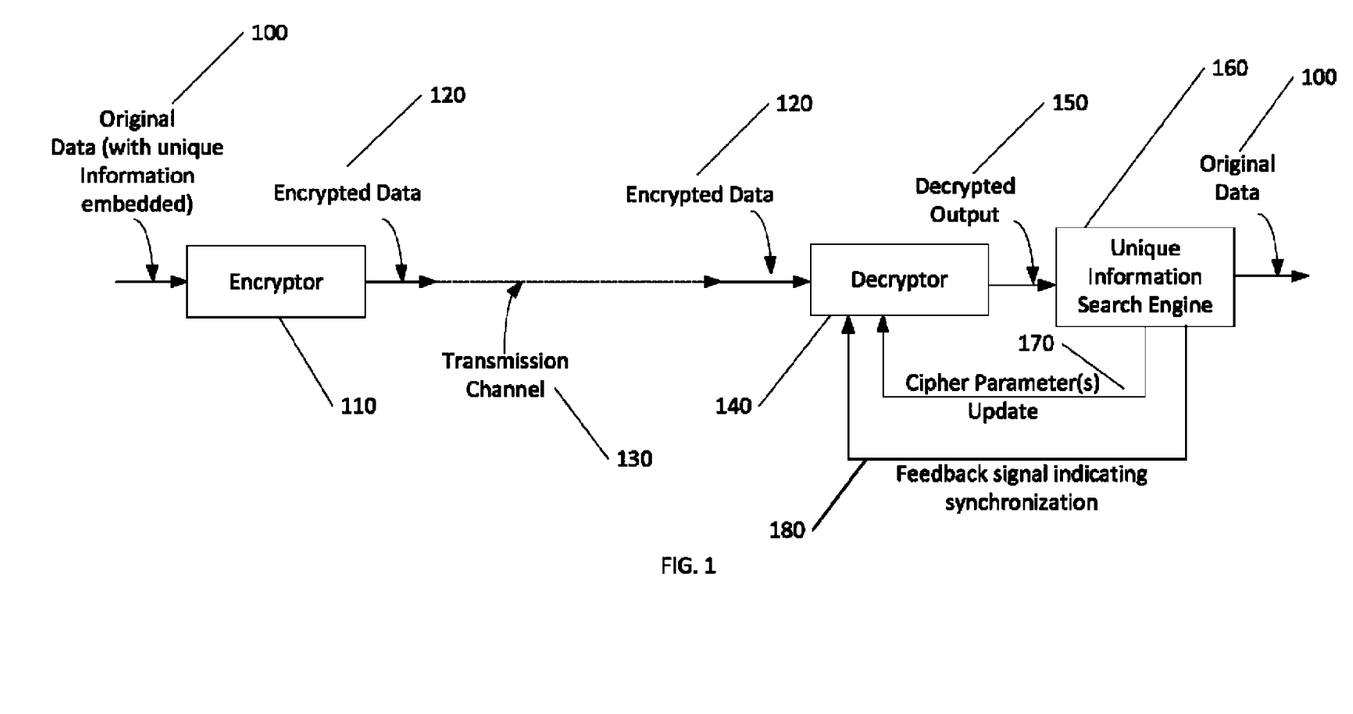
FIG. 1 is a block diagram of an implementation of a system that uses unique information within the transmitted data stream to confirm successful decryption based on synchronization of a cryptographic parameter.

FIG. 1 shows a block diagram depicting an implementation of the system across a communications channel in which a data stream having unique information native to the data stream 100 is encrypted by an encryption device 110. The encrypted data stream 120 is then sent across a communications channel 130 to a receiving device having a decryptor 140. The decryptor 140 attempts to decrypt the encrypted data stream 120 received and provides a decrypted output 150 to a search engine 160 that processes the output received from the decryptor 140 and searches for the unique information within the data stream. While the output signal 150 is decrypted, the decryption does not necessarily initially provide a correct and cryptographically synchronized result. Accordingly the search engine 160 provides a feedback loop to the decryptor 140 for synchronizing cryptographic parameters by transmitting a signal 170 to the decryptor 140 that provides information about the existence or lack of cryptographic synchronization. For example, in FIG. 1, the search engine 160 transmits a signal 170 to the decryptor 140 indicating the need to update a particular cryptographic parameter until successful decryption is determined, at which time feedback signal 180 may be transmitted to the decryptor 140 indicating that successful decryption has been confirmed. Therefore, the processing is iterative and this feedback loop continues until search engine 160 confirms a decrypted output of the original data 100 containing the unique information.

Successful decryption is recognized when the search engine 160 detects that an acquisition threshold has been attained. This acquisition threshold may comprise, for example, a configurable value, a single event, or a series of events.

Figure 2:
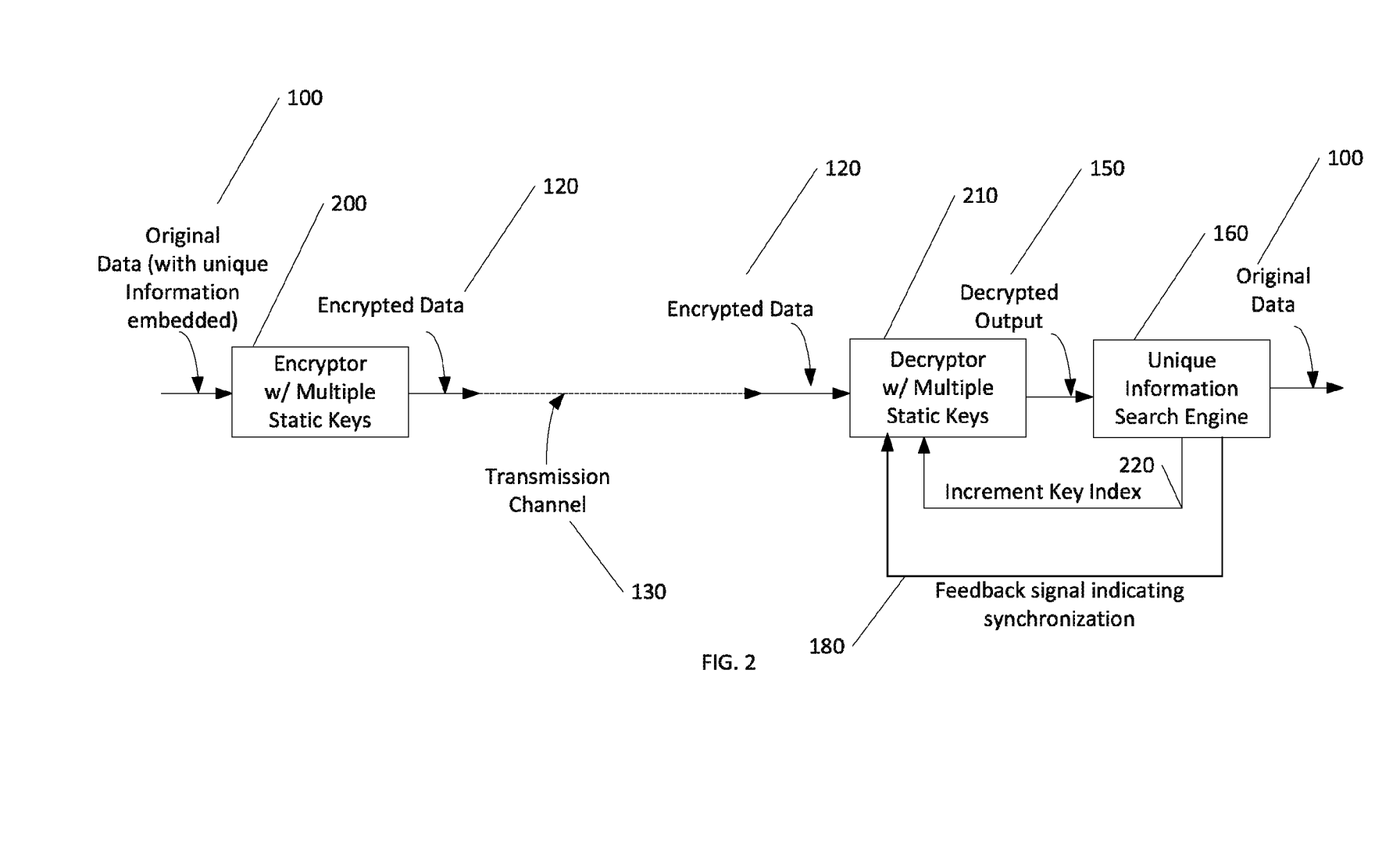
FIG. 2 is a block diagram of an implementation of a system that uses unique information within the transmitted data stream to confirm successful decryption based on synchronization of a key index.

FIG. 2 shows how implementations of this method may be applied to synchronizing a key index between secure transmission links. Here, an encryption device having a plurality of static keys 200 encrypts data stream 100 that has unique information inherent within the native data stream. The encrypted data 120 is transmitted across communications channel 130 to a receiving device having a decryptor 210 that has a plurality of static keys. As decryptor 210 attempts to decrypt the encrypted data 120 and transmits an output to search engine 160 which iteratively processes the signal received from decryptor 210 transmits a signal 220 back to decryptor 210 indicating a need for the decryptor 210 to advance to a next incremental key index and attempt to decrypt the encrypted data again when cryptographic synchronization is not detected by the search engine 160.

Figure 3:
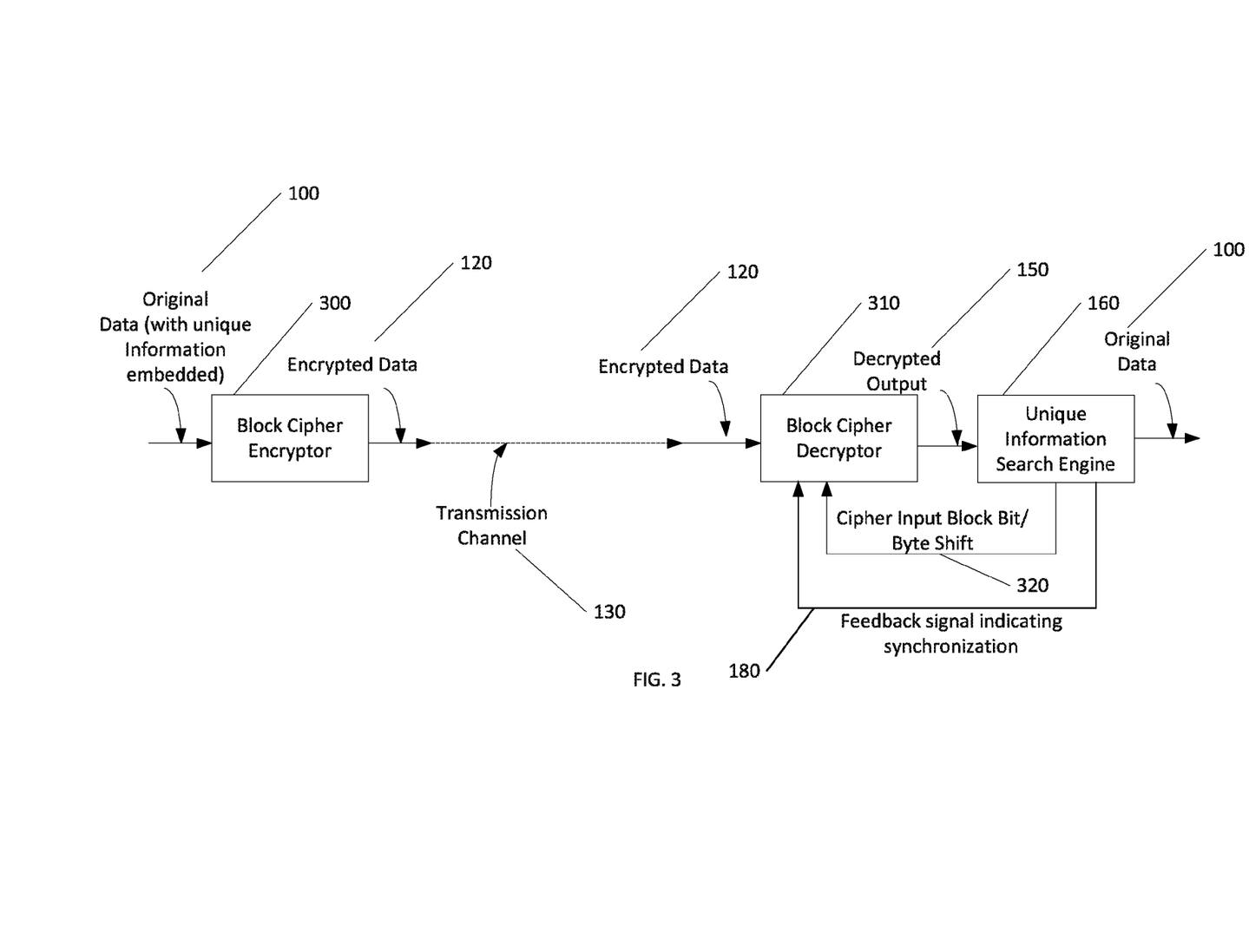
FIG. 3 is a block diagram of an implementation of a system that uses unique information within the transmitted data stream to confirm successful decryption based on synchronization of a cipher block boundary.

FIG. 3 shows how implementations of the method may be applied to synchronizing block cipher boundaries between secure transmission links. As shown, block cipher encryption device 300 encrypts an original data stream 100 that has unique information inherently embedded in the native data stream. This encrypted data 120 is then transmitted across communications channel 130 and received by a receiving device having a block cipher decryptor 310 that attempts to decrypt the received encrypted data 120. Block cipher decryptor 310 transmits an output to search engine 160 and in the event that search engine 160 determines that cryptographic synchronization does not exist, search engine 160 transmits a signal 320 to the block cipher decryptor 310 indicating that block cipher decryptor 310 must shift to the next incremental cipher input block bit or byte and attempt decryption again until search engine 160 receives a successfully decrypted output 150 that contains the unique information included within original data stream 100, prior to encryption.

Figure 4:
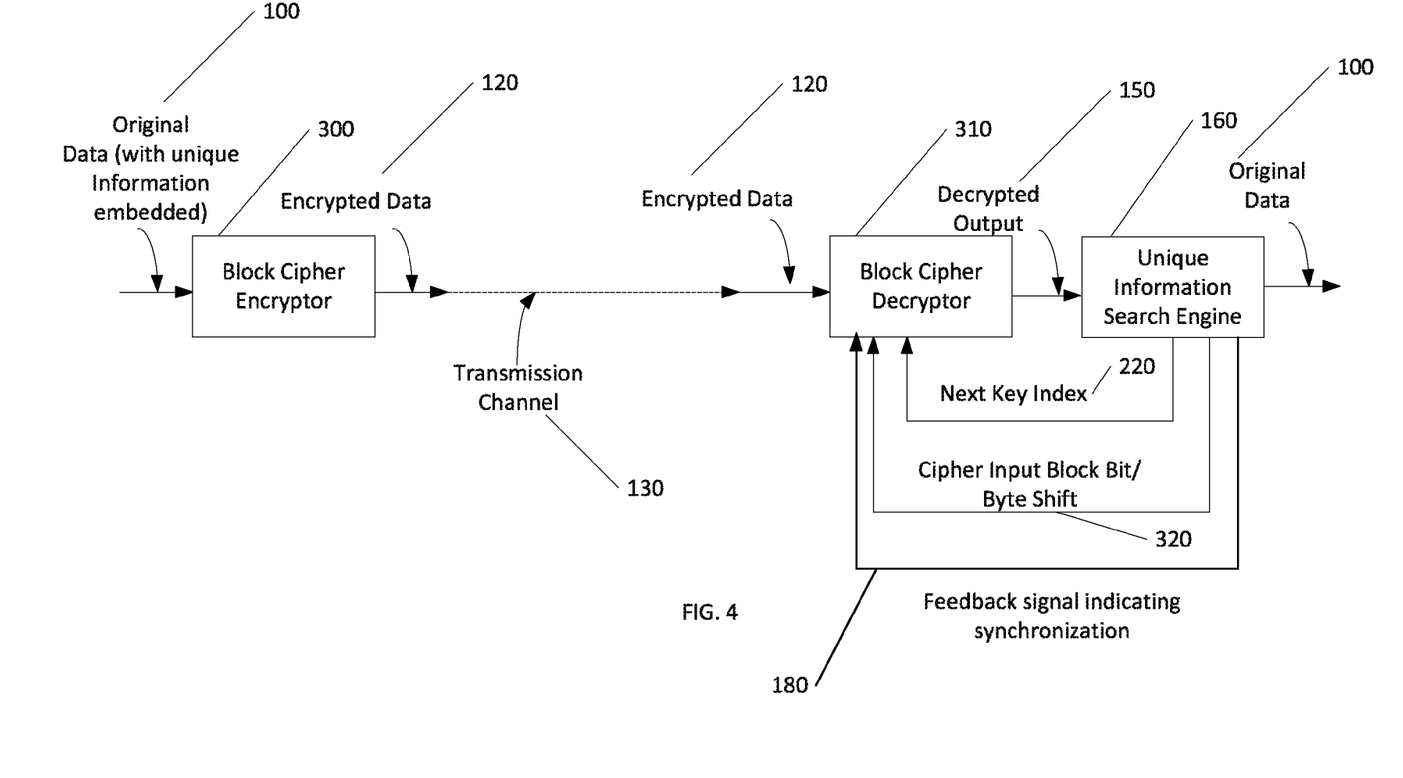
FIG. 4 is a block diagram of an implementation of a system that uses unique information within the transmitted data stream to confirm successful decryption based on synchronization of a cipher block boundary and a key index.

FIG. 4 shows how implementations of the method may be applied to synchronizing both key index and input block cipher boundaries between secure transmission links. Thus, the search engine 160 may iterate through a multi-dimensional array of cryptographic parameters while searching for convergence. FIG. 4 shows a case in which a decryptor 310 is uses information inherent within the transmitted data as confirmation for successful decryption as it searches to synchronize onto the input cipher block boundary as well as the key index. Thus, this approach is extensible to a multidimensional array of cryptographic parameters.

Thus, utilizing implementations of the disclosed systems and methods may provide an end-to-end encrypted path that is more bandwidth efficient as well as increased security by encrypting all transmitted data bits without exposing any framing structure or cryptographic related signaling.

Figure 5:
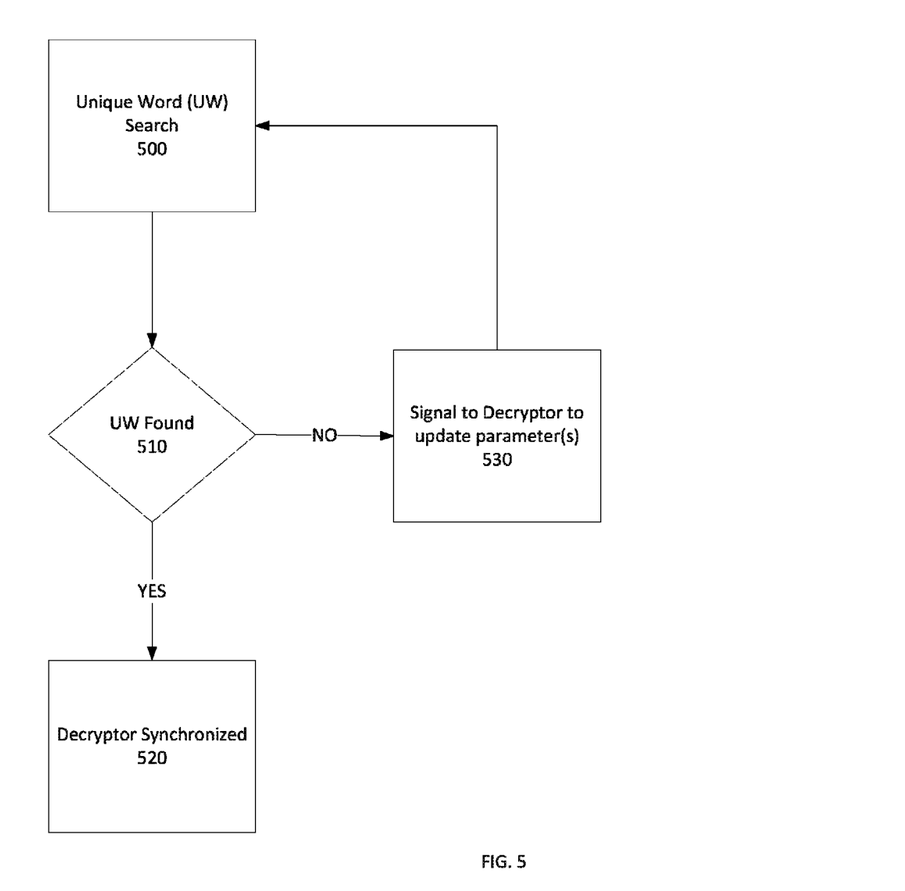
FIG. 5 is a logic flow-chart for an implementation of a search engine that leverages periodically occurring known patterns or unique words.

FIG. 5 shows a decision making flow-chart for an implementation of a search engine, such as a unique information search engine, that leverages on periodically occurring known patterns or one or more unique words (UW). When the search engine conducts a search 500 and successfully finds 510 a predetermined number of periodically occurring UWs, it can successfully declare that the decryptor has achieved synchronization 520. Otherwise, a feedback signal is sent to the decryptor to update one or more parameters of interest 530 and the iterative process continues.

Figure 6:
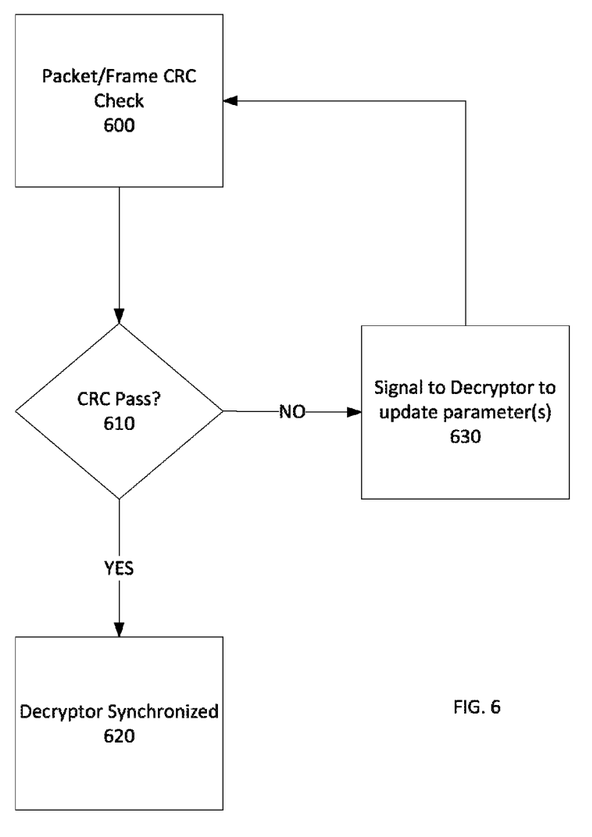
FIG. 6 is a logic flow-chart for an implementation of a search engine that leverages a frame checksum or CRC scheme inherent to the original data.

FIG. 6 shows a decision making flow-chart for an implementation of a search engine, such as a unique information search engine, that leverages on a frame checksum or CRC scheme inherent to the data. When the search engine searches for 600 and successfully matches 610 a CRC checksum computed on a predetermined number of consecutive decrypted packets or frames, it declares cryptographic synchronization 620. Otherwise, a feedback signal is sent to the decryptor to update one or more parameters of interest 630 and the iterative process continues.

Implementations of the methods and systems described in this disclosure may employ digital signal processing (DSP) techniques such as, but not limited to, encapsulation, encryption/decryption, framing and packetization techniques which can easily be implemented in Field-Programmable Gate Array (FPGA), Programmable Logic Device (PLD), Programmable Integrated Circuit (PIC), Digital Signal Processor (DSP), Application Specific Integrated Circuit (ASIC) or general purpose microprocessors using conventional implementation methods known in the art with knowledge of this disclosure.

As used herein, terms such as component, system, processor, and the like are intended to refer to a computer-related entity, either hardware, a combination of hardware and software, software, or software in execution. For example, a processor may be, but is not limited to being, a process running on a computer hardware processor, a hardware component referred to as a processor, an object, an instance, an executable, a thread of execution, a program, program or processing logic and/or a computer. By way of illustration, both an application running on a computer and the computer can be a component. One or more components may reside within a process and/or thread of execution and a component may be localized on one computer and/or distributed between two or more computers.

In implementations of the described method, synchronization of such cryptographic parameters is achieved without the need for any additional bandwidth. After the decryption, a search engine inspects the decrypted output for known information within the transmitted data for confirmation of proper decryption. Implementations of the system may implement a state machine to check and provide feedback to the decryptor. An iterative process between the decryptor and the search engine resumes until the cryptographic parameter(s) has been synchronized.

Implementations of the described method provide a more secure transmission link in which no cryptographic messaging or framing structure is utilized that could be used as information to weaken the secure link. With this approach, it is possible to implement a bulk encryptor that encrypts all data including headers, payload and footers, without any framing structure defining boundaries.

The tradeoff of this approach is that there is a longer acquisition time as the search engine iteratively runs through all possible permutations to synchronize a particular parameter. For example, assume a satellite link is operating at a bit rate of 64 kbps. Two endpoints are establishing secure communication using an implementation of the disclosed method. In this example, both endpoints are configured for 26 static keys, with the intent of rolling keys once every two weeks. The decryptor has no knowledge of which of the 26 possible keys is being currently used. However, the search engine knows that the encrypted data has a CRC checksum as part of its framing structure and will use this information to validate and search for the correct key index to decrypt the data. Assuming that the decryptor starts at an initial state with key index 1, in the worst case it will have to try all 26 keys to confirm proper decryption. Assuming that the frame length is 8192 bits, and that the search engine requires, but is not limited to, three consecutive CRC matches to declare successful cryptographic synchronization, the decryptor's acquisition time is (26×8192×3)/64 kbps=9.984 seconds. Thus, this approach may contribute an additional 9.984 seconds to the overall system acquisition time. The total acquisition time may be reduced on subsequent acquisitions if the initial state of the key index search is the last stored key index found. This may potentially make acquisition using this approach much more efficient in certain applications, such as satellite communications, where the quality of the link cannot be guaranteed and receivers may occasionally lose signal lock and require re-acquisition.

In particular implementations, a storage or memory device may be utilized on the decryptor side to ensure lossless transitions during changes to the synchronized cryptographic parameter(s). In the above example, if keys are rolled and the key index has been incremented, a buffer sufficient to store enough bits for the search engine to detect loss of lock and re-synchronize to the next key index may be implemented. Such a buffer may be useful to accommodate lossless transition or changes to a cryptographic parameter that has already been synchronized.

The following are particular implementations of a method for providing self synchronizing cipher and are provided as non-limiting examples:

EXAMPLE 1

The output of a cryptographic device is connected to a modulator and is transmitting over a transmission medium to a receiving device.

EXAMPLE 2

As described in Example 1, keying information may be entered by a user on the encryption device and decryption device manually. There may be multiple keys defined to also support key-rollover.

EXAMPLE 3

As described in Example 1, an encryption device may receive an original signal with a frame CRC.

EXAMPLE 4

As described in Example 1, an encryption device may receive an original signal with a periodically occurring known data sequence.

EXAMPLE 5

As described in Example 1, an encryption device may encrypt the data using symmetric encryption such as AES or Triple-DES to encrypt the data.

EXAMPLE 6

As described in Example 1, an encryption device may encrypt using block cipher such AES or Triple-DES.

EXAMPLE 7

As described in Example 1, an encryption device may use a stream cipher for encrypting the original data.

EXAMPLE 8

Using an implementation of the described method, a decryptor receives encrypted data stream from a receiving device. The encryptor and the decryptor may both be using the same set of encryption keys to encrypt and decrypt the data. A search engine checks for particular known information inherent to the encrypted transmitted data bits. A recursive search is performed on the key index, until the search engine has confirmed and validated proper decryption of the data.

EXAMPLE 9

As described in Example 8, the keying information may be entered by the user on the encryption device and decryption device manually.

EXAMPLE 10

As described in Example 8, a decryption device may decrypt the data using symmetric encryption such as AES or Triple-DES to match the encrypting device.

EXAMPLE 11

As described in Example 8, a decryption device may decrypt using block cipher such AES or Triple-DES to match the encrypting device.

EXAMPLE 12

As described in Example 8, a decryption device may use a stream cipher for decrypting the original data.

EXAMPLE 13

As described in Example 8, a decryption device may use the search engine to search for N consecutive correct checksum or CRC to confirm cipher synchronization.

EXAMPLE 14

As described in Example 8, a decryption device may use the search engine to search for N periodically occurring unique sequences to confirm cipher synchronization.

EXAMPLE 15

As described in Example 8, the key index may be incremented sequentially until all possible key indices may be tried before cipher synchronization is achieved.

EXAMPLE 16

Using an implementation of the described method, a decryptor receives the encrypted data stream from the receiving device. However, the data input to the decryptor may not be cipher block aligned. The search engine checks for particular known information inherent to the encrypted transmit data bits. A recursive search on the key index is performed until the search engine has confirmed and validated proper decryption of the data.

EXAMPLE 17

As described in Example 16, the keying information may be entered by the user on the encryption device and decryption device manually.

EXAMPLE 18

As described in Example 16, a decryption device may decrypt the data using symmetric encryption such as AES or Triple-DES to match the encrypting device.

EXAMPLE 19

As described in Example 16, a decryption device may decrypt using block cipher such AES or Triple-DES to match the encrypting device.

EXAMPLE 20

As described in Example 16, a decryption device may use a stream cipher for decrypting the original data.

EXAMPLE 21

As described in Example 16, a decryption device may use the search engine to search for N consecutive correct CRC checksums to confirm cipher synchronization.

EXAMPLE 22

As described in Example 16, a decryption device may use search engine to search for N periodically occurring unique sequences to confirm cipher synchronization.

EXAMPLE 23

As described in Example 16, the cipher input may be shifted by bits or bytes sequentially until all possible block alignments may be tried before cipher synchronization is achieved.

EXAMPLE 24

Using an implementation of the described method, a decryptor receives the encrypted data stream from the receiving device. However, the data input to the decryptor may not be cipher block aligned nor key index synchronized. The search engine checks for particular known information inherent to the encrypted transmit data bits. A two dimensional recursive search on the key index and cipher block alignment is performed, until the search engine has confirmed and validated proper decryption of the data.

EXAMPLE 25

As described in Example 24, the keying information may be entered by the user on the encryption device and decryption device manually.

EXAMPLE 26

As described in Example 24, a decryption device may decrypt the data using symmetric encryption such as AES or Triple-DES to match the encrypting device.

EXAMPLE 27

As described in Example 24, a decryption device may decrypt using block cipher such AES or Triple-DES to match the encrypting device.

EXAMPLE 28

As described in Example 24, a decryption device may use the search engine to search for N consecutive correct CRC checksums to confirm cipher synchronization.

EXAMPLE 29

As described in Example 24, a decryption device may use the search engine to search for N periodically occurring unique sequences to confirm cipher synchronization.

EXAMPLE 30

As described in Example 24, the cipher input may be shifted by its or bytes sequentially until all possible block alignments may be tried as well as indexing through all possible key indices before cipher synchronization is achieved.

In places where the description above refers to particular implementations of self-synchronizing decryption systems and methods, it should be readily apparent that a number of modifications may be made without departing from the spirit thereof and that these implementations may be applied to other self synchronizing decryption system and method implementations.

The invention claimed is:

1. A method for encryption and decryption synchronization for a communications channel comprising:
    encrypting a communications channel using a data encryption device, the communications channel comprising a data stream having unique information native to the data stream;
    transmitting the encrypted data stream using a transmitter without applying an additional framing structure or a multiplexing signaling message before or after the data stream is encrypted such that the encrypted data stream does not require additional bandwidth to support cryptographic synchronization;
    receiving by a receiver comprising a decryption device, the transmitted encrypted data stream; and
    identifying the unique information within the transmitted data stream by iteratively decrypting the encrypted data stream using a processor until a cryptographic parameter is found that results in cryptographic synchronization between the encryption and decryption devices based on a priori knowledge of the unique information within the transmitted data stream.

2. The method of claim 1, wherein the unique information comprises a repeating pattern.

3. The method of claim 2, wherein the repeating pattern comprises at least one of a header, a control sequence, a pilot sequence, and a trailing sequence.

4. The method of claim 1, wherein the unique information comprises one or more bits, words, symbol, pilot sequences, or training sequences.

5. The method of claim 1, wherein the data stream comprises an error detection scheme.

6. The method of claim 5, wherein the error detection scheme comprises a parity bit, checksum or a cyclic redundancy check.

7. The method of claim 1, wherein the cryptographic parameter comprises a plurality of parameters constituting a multidimensional array.

8. The method of claim 1, wherein the cryptographic parameter comprises an encryption block boundary that is independent of a location of the unique information within the data stream.

9. The method of claim 1, wherein the cryptographic parameter is an encryption key index.

10. The method of claim 1, wherein the cryptographic parameter is dynamically changing.

11. A method of determining cryptographic synchronization of encrypted data transmitted across a communication channel comprising:
   receiving by a receiver, an encrypted communications channel comprising a data stream having a unique information native to the data stream prior to encryption to which an additional framing structure or a multiplexing signaling message has not been applied before or after the data stream is encrypted;
   attempting to decrypt the encrypted data stream using a decryption device and one or more a priori cryptographic keys;
   iteratively processing, using a processor, a decrypted signal output from the decryption device; and
   determining, by the processor, that cryptographic synchronization exists between the decryption device and an encryption device by identifying the unique information native to the data stream based on the iterative processing.

12. The method of claim 11, further comprising transmitting, by the processor, a signal to the decryption device that indicates the existence of cryptographic synchronization.

13. The method of claim 11, further comprising transmitting, by the processor, a signal to the decryption device indicating nonexistence of cryptographic synchronization and prompting the decryption device to advance to a different cryptographic key index.

14. The method of claim 11, further comprising transmitting, by the processor, a signal to the decryption device indicating nonexistence of cryptographic synchronization and prompting the decryption device to advance the cryptographic boundary in steps of one or more bits, bytes, words, frames, packets, symbols, or pilot sequences.

15. The method of claim 11, wherein the processor performs a multi-dimensional recursive search by iteratively processing the decrypted signal output based on a plurality of cryptographic parameters.

16. The method of claim 11, wherein the decryption device uses all possible a priori key indices.

17. The method of claim 16, further comprising using an a priori codebook by the decryption device to step through all possible a priori cryptographic key indices.

18. The method of claim 11, wherein the processor determines whether cryptographic synchronization exists based on an acquisition threshold that comprises a configurable value.

19. The method of claim 18, wherein the acquisition threshold comprises a single event.

20. The method of claim 18, wherein the acquisition threshold comprises a series of events.

21. The method of claim 11, wherein the decryption device resumes operation in a last known state of cryptographic synchronization after a loss of cryptographic synchronization is detected.

22. The method of claim 11, wherein the processor ceases iteratively processing when cryptographic synchronization is determined to exist.

23. The method of claim 11, wherein the processor continues iteratively processing after cryptographic synchronization is determined to exist based on a change in one or more dynamic cryptographic parameters.

24. The method of claim 23, further comprising updating a cryptographic key index based on a key-rollover event.

25. The method of claim 11, further comprising storing, by a memory device, the received encrypted data stream thereby ensuring lossless transition during a change in one or more dynamic cryptographic parameters.

26. A system for encryption and decryption synchronization for a communications channel comprising:
   an encryption device configured to encrypt a communications channel, the communications channel comprising a data stream having unique information native to the data stream;
   a transmitter configured to transmit the encrypted data stream without applying an additional framing structure or a multiplexing signaling message before or after the data stream is encrypted such that the encrypted data stream does not require additional bandwidth to support cryptographic synchronization;
   a receiver comprising a decryption device and configured to receive the transmitted encrypted data stream; and
   a processing device configured to identify the unique information within the transmitted data stream by iteratively decrypting the encrypted data stream until a cryptographic parameter is found that results in cryptographic synchronization between the encryption and decryption devices based on a priori knowledge of the unique information within the transmitted data stream.

27. The system of claim 26, wherein the unique information comprises a repeating pattern.

28. The system of claim 27, wherein the repeating pattern comprises at least one of a header, a control sequence, a pilot sequence, and a trailing sequence.

29. The system of claim 26, wherein the unique information comprises one or more bits, words, symbol, pilot sequences, or training sequences.

30. The system of claim 26, wherein the data stream comprises an error detection scheme.

31. The system of claim 30, wherein the error detection scheme comprises a parity bit, checksum, or a cyclic redundancy check.

32. The system of claim 26, wherein the cryptographic parameter comprises a plurality of parameters constituting a multidimensional array.

33. The system of claim 26, wherein the cryptographic parameter comprises an encryption block boundary that is independent of a location of the unique information within the data stream.

34. The system of claim 26, wherein the cryptographic parameter is an encryption key index.

35. The system of claim 26, wherein the cryptographic parameter is dynamically changing.

36. A system for determining cryptographic synchronization of encrypted data transmitted across a communication channel comprising:
   a receiver configured to receive an encrypted communications channel comprising a data stream having a unique information native to the data stream prior to encryption to which an additional framing structure or a multiplexing signaling message has not been applied before or after the data stream is encrypted;
   a decryption device configured to attempt to decrypt the encrypted data stream using one or more a priori cryptographic keys; and
   a processing device configured to iteratively process a decrypted signal output from the decryption device and determine that cryptographic synchronization exists between the decryption device and an encryption device by identifying the unique information native to the data stream based on the iterative processing.

37. The system of claim 36, wherein the processing device is further configured to transmit a signal to the decryption device that indicates the existence of cryptographic synchronization.

38. The system of claim 36, wherein the processing device is further configured to transmit a signal to the decryption device indicating nonexistence of cryptographic synchronization and prompting the decryption device to advance to a different cryptographic key index.

39. The system of claim 36, wherein the processing device is further configured to transmit a signal to the decryption device indicating nonexistence of cryptographic synchronization and prompting the decryption device to advance the cryptographic boundary in steps of one or more bits, bytes, words, frames, packets, symbols, or pilot sequences.

40. The system of claim 36, wherein the processing device is further configured to perform a multi-dimensional recursive search by iteratively processing the decrypted signal output based on a plurality of cryptographic parameters.

41. The system of claim 36, wherein the decryption device is configured to use all possible a priori key indices.

42. The system of claim 41, wherein the decryption device is configured to use an a priori codebook by the decryption device to step through all possible a priori cryptographic key indices.

43. The system of claim 36, wherein the processing device is further configured to determine whether cryptographic synchronization exists based on an acquisition threshold that comprises a configurable value.

44. The system of claim 43, wherein the acquisition threshold comprises a single event.

45. The system of claim 43, wherein the acquisition threshold comprises a series of events.

46. The system of claim 36, wherein the decryption device is configured to resume operation in a last known state of cryptographic synchronization after a loss of cryptographic synchronization is detected.

47. The system of claim 36, wherein the processing device is configured to cease iteratively processing when cryptographic synchronization is determined to exist.

48. The system of claim 36, wherein the processing device is configured to continue iteratively processing after cryptographic synchronization is determined to exist based on a change in one or more dynamic cryptographic parameters.

49. The system of claim 48, wherein the decryption device is further configured to update a cryptographic key index based on a key-rollover event.

50. The system of claim 36, further comprising a memory device configured to store the received encrypted data stream thereby ensuring lossless transition during a change in one or more dynamic cryptographic parameters.

* * * * *